United States Patent
Nisino et al.

(10) Patent No.: US 10,451,445 B2
(45) Date of Patent: Oct. 22, 2019

(54) ABSOLUTE ENCODER INCLUDING ABNORMALITY DETECTION UNIT FOR DETECTING ABNORMALITY OF CONSUMPTION CURRENT

(71) Applicant: FANUC CORPORATION, Minamitsuru-gun, Yamanashi (JP)

(72) Inventors: Shouhei Nisino, Yamanashi (JP); Hirofumi Kikuchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/010,989

(22) Filed: Jun. 18, 2018

(65) Prior Publication Data

US 2018/0372514 A1    Dec. 27, 2018

(30) Foreign Application Priority Data

Jun. 23, 2017    (JP) .................................. 2017-123587

(51) Int. Cl.
*G01D 5/249*    (2006.01)
*G01D 5/244*    (2006.01)

(52) U.S. Cl.
CPC ....... *G01D 5/2497* (2013.01); *G01D 5/24466* (2013.01); *G01D 5/24495* (2013.01); *G01D 5/24485* (2013.01)

(58) Field of Classification Search
CPC ............. G01D 5/2497; G01D 5/24495; G01D 5/24466; G01D 5/24457; G01D 5/24485
See application file for complete search history.

(56) References Cited

U.S. PATENT DOCUMENTS

| 9,784,597 | B2 | 10/2017 | Tanabe et al. | |
|---|---|---|---|---|
| 2009/0229134 | A1* | 9/2009 | Nagase | G01D 5/24457 33/1 PT |
| 2015/0323345 | A1* | 11/2015 | Yeoh Yong | G01D 5/24476 324/207.25 |
| 2016/0223363 | A1* | 8/2016 | Fujita | G01D 5/24461 |

FOREIGN PATENT DOCUMENTS

| CN | 106796122 A | 5/2017 |
|---|---|---|
| JP | 2000-041345 A | 2/2000 |
| JP | 2005-223985 A | 8/2005 |
| JP | 2007-292691 A | 11/2007 |
| JP | 2008216115 A | 9/2008 |
| JP | 2016149884 A | 8/2016 |

* cited by examiner

*Primary Examiner* — Huy Q Phan
*Assistant Examiner* — Adam S Clarke
(74) *Attorney, Agent, or Firm* — RatnerPrestia

(57) ABSTRACT

An absolute encoder that receives a current from an electronic power supply includes: a plurality of regulators connected in parallel with one another that receive a drive current from an electronic power supply in which a magnitude of a constant voltage output to the absolute encoder and a magnitude of a drive current needed for outputting the constant voltage are different; a voltage detection unit configured to detect an output voltage of at least one regulator of the plurality of regulators; and an abnormality detection unit for detecting an abnormality of a current from an electronic power supply consumed when the absolute encoder is driven based on the output voltage detected by the voltage detection unit.

9 Claims, 7 Drawing Sheets

ALARM SIGNAL

ABSOLUTE ENCODER INCLUDING ABNORMALITY DETECTION UNIT FOR DETECTING ABNORMALITY OF CONSUMPTION CURRENT

CROSS-REFERENCE TO RELATED APPLICATION

This application is a new U.S. Patent Application that claims benefit of Japanese Patent Application No. 2017-123587, filed Jun. 23, 2017, the disclosure of this application is being incorporated herein by reference in its entirety for all purposes.

BACKGROUND OF THE INVENTION

1. Field of the Invention

The present invention relates to an absolute encoder including an abnormality detection unit for detecting an abnormality of a consumption current.

2. Description of the Related Art

An absolute encoder is provided to detect positions of motors provided to a machine tool, a robot, etc., and a rotation shaft. The absolute encoder includes a memory for storing (holding) position information, home position information, etc., on the detected motor, the detected rotation shaft, etc. Further, the memory stores not only the position information detected by the absolute encoder, but sometimes stores various pieces of information on machines such as the machine tool, the robot, etc., to which the absolute encoder is attached. For example, a type and a serial number of the motor to which the absolute encoder is attached are sometimes stored in the memory to be used for the maintenance work such as repairing of the motor, the call number of the motor control parameter is stored in the memory so as to enable setting the parameter automatically in plug and play, or pieces of motor-specific information such as a back-emf constant, an inductance, a resistor, and a mounting deviation angle of the motor are stored in the memory to achieve the efficiency and the stabilization of the motor control.

The absolute encoder receives an electric power from a control power supply to maintain information stored in the internal memory. When the electric power is not supplied from the control power supply to the absolute encoder, such as when the machine tool, the robot, etc., to which the absolute encoder is provided end operations and when a power failure occurs, since the information stored in the memory in the absolute encoder is lost, to the absolute encoder, separately from the control power supply, a back-up power supply is connected and the absolute encoder receives the backup power.

For example, Japanese Unexamined Patent Publication (Kokai) No. 2007-292691 discloses as follows: "the absolute encoder is connected with non-control devices such as a rotation unit such as an industrial machine, a machine tool, or an industrial robot and such as a motor shaft and detects and holds a position or a linear position of various rotation units of the non-control device. A control device that drives the non-control device is not always in the operating state, for example, when the non-control device ends the operations and when the power failure occurs, the electric power is not supplied to the control device, and thus, since the electric power is not supplied to the absolute encoder also, the position information detected by the absolute encoder, etc., is lost. Thus, conventionally the back-up power supply is prepared in advance, and if the electric power is not supplied to the control device, from the back-up power supply, the electric power is supplied to the absolute encoder."

For example, Japanese Unexamined Patent Publication (Kokai) No. 2005-223985 discloses as follows: "in the walk robot, to facilitate the appropriate control of the joint such as the legs after the electronic power supply is turned on again, it is desirable to maintain the joint positioning function of the encoder even after intentional power supply disconnection or if there is power supply disconnection due to an unintended cause, and for this purpose, it is necessary to supply the back-up power supply to the storage mean for storing the output signal of the encoder even after the main electronic power supply is tuned off."

For example, as disclosed in Japanese Unexamined Patent Publication (Kokai) No. 2000-041345, a method is known in which an encoder drives a signal process unit for outputting the encoder signal obtained by digitalizing the analog detection signal by the main electronic power supply, when the main electronic power supply is in the power failure, backup drives the signal process unit with the battery, includes a voltage monitoring circuit connected with the battery, even when the signal process unit is backup driven only by the battery, operates the voltage monitoring circuit, and monitors the voltage drop of the battery.

When an abnormality such as the short-circuiting of the internal circuit of the absolute encoder or the defect of the mounted component occurs, the current supplied to the absolute encoder increases (i.e., current consumed by absolute encoder). In a state where, the electric power is supplied from the back-up power supply to the absolute encoder and the absolute encode is driven, when the abnormality associated with the increase in the consumption current occurs in the absolute encoder, the consumption of the back-up power supply is accelerated. If the consumed back-up power supply is continuously used without replacing the consumed back-up power supply, since a state where the electric power is not supplied from the back-up power supply to the absolute encoder, continues, when the electric power is not supplied from the control power supply such as when the machine tool, the robot, etc., to which the absolute encoder is provided end the operations and when the power failure occurs, the information stored in the memory in the absolute encoder is lost. As a result, it is needed to acquire again the home position information of the absolute encoder and store again various pieces of information on machines such as the machine tool, the robot, etc., to which the absolute encoder is attached, and accordingly, work efficiency is lowered. If the operator continues to use the absolute encoder without noticing the consumption of the back-up power supply, it may not be possible to acquire the accurate position information and in some cases, a serious accident may occur to the machine tool, the robot, etc., to which the absolute encoder is provided. On the other hand, the back-up power supply that has not been consumed may be prematurely replaced.

Even in the absolute encoder that is driven by the electric power supplied from the control power supply instead of the back-up power supply, the abnormality associated with the increase in the consumption current may occur, and there is a failure in the control power supply.

Although it is conceivable to monitor the current that flows from the back-up power supply or the control power supply to the absolute encoder with the current detection circuit using the shunt resistor, and detect the abnormality associated with the increase in the consumption current in the absolute encoder, a shunt resistor is very expensive.

SUMMARY OF THE INVENTION

In the field of the absolute encoder, a low-cost technique enabling the accurate detection of the abnormality associated with the increase in the consumption current is desired.

In one aspect of the present disclosure, the absolute encoder that drives based on the current supplied from the electronic power supply includes a plurality of regulators connected in parallel with each other that receive the drive current from the electronic power supply in which the magnitude of the constant voltage output to the absolute encoder and the magnitude of the drive current needed for outputting the constant voltage are different, a voltage detection unit configured to detect an output voltage of at least one regulator of the plurality of regulators, and the abnormality detection unit for detecting the abnormality of the current from the electronic power supply consumed when the absolute encoder drives based on the output voltage detected by the voltage detection unit.

BRIEF DESCRIPTION OF DRAWINGS

The present invention will be more clearly understood with reference to the following accompanying drawings.

DETAILED DESCRIPTION

Figure 1:
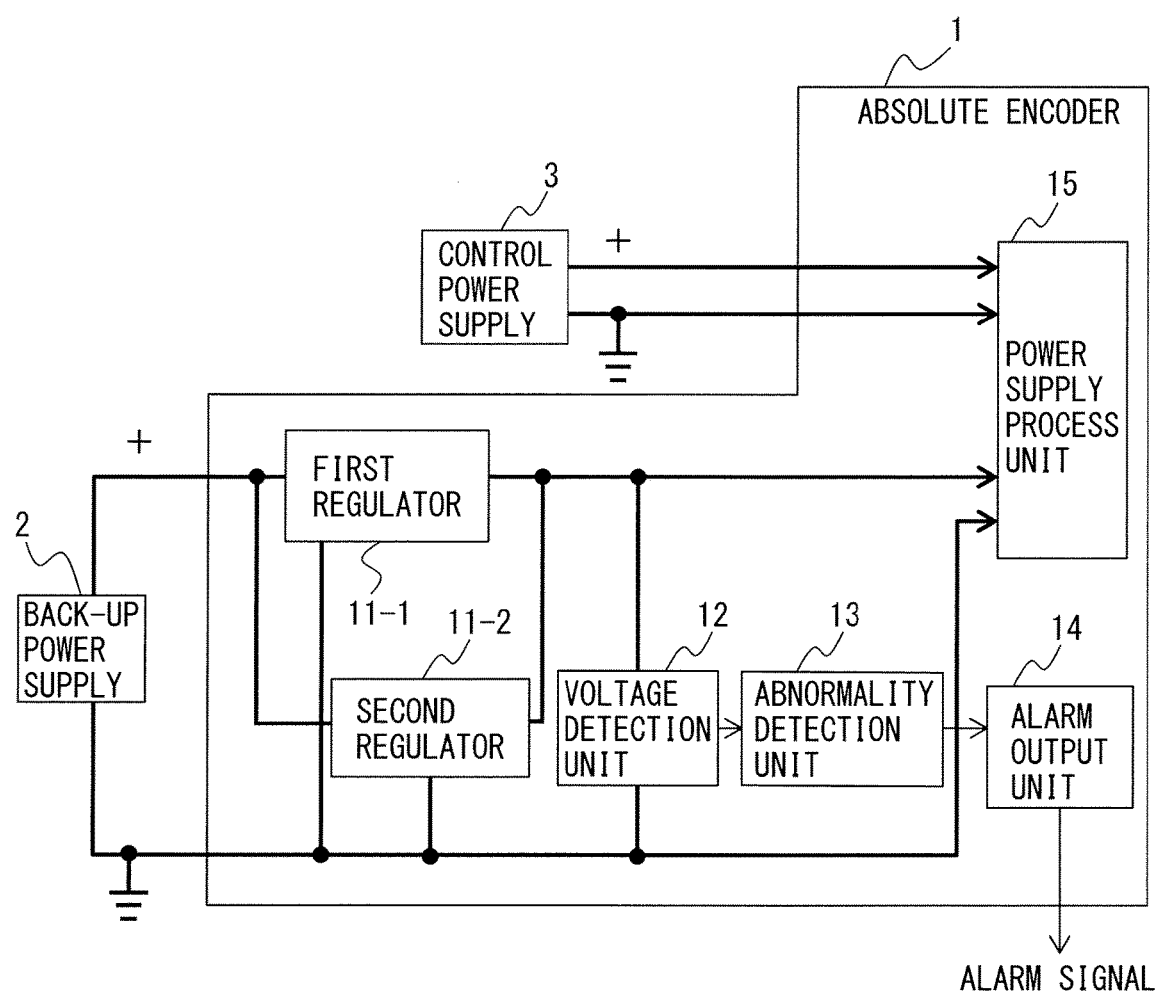
FIG. 1 is a drawing illustrating an absolute encoder according to a first embodiment.

With reference to the drawings, the absolute encoder including the abnormality detection unit for detecting the abnormality of the consumption current is described below. In each drawing, a like member is denoted with a like or similar reference numeral. Further, a member denoted with a like or similar reference numeral in different drawings is meant to be an element having similar functions. In addition, in order to facilitate understanding, the drawings are scaled appropriately.

The absolute encoder is attached to, for example, the motor provided to the machine tool, the robot, etc., and the rotation shaft, and detects the positions of the motor and the rotation shaft. The absolute encoder according to the embodiment of the present disclosure includes a plurality of regulators connected in parallel with each other that receive the drive current from the electronic power supply in which the magnitude of the constant voltage output to the absolute encoder and the magnitude of the drive current needed for outputting the constant voltage are different, a voltage detection unit configured to detect the output voltage of at least one regulator of the plurality of regulators, the abnormality detection unit for detecting the abnormality of the current from the electronic power supply consumed when the absolute encoder drives based on the output voltage detected by the voltage detection unit, and an alarm output unit configured to output an alarm signal when the abnormality detection unit detects that the abnormality occurs in the current consumed by the absolute encoder. The absolute encoder is driven based on the current supplied from the electronic power supply, but the electronic power supply for outputting the current for driving the absolute encoder includes at least one of the control power supply and the back-up power supply different from the control power supply. The back-up power supply supplies the backup power different from the electric power from the control power supply and is configured from, for example, a primary battery, a secondary battery, or a constant voltage source.

In the embodiment of the present disclosure, the following is listed below: in a state where the backup power is supplied from the back-up power supply, the absolute encoder that can detect the occurrence of the abnormality associated with the increase in the consumption current; in a state where the electric power is supplied from the control power supply, the absolute encoder that can detect the occurrence of the abnormality associated with the increase in the consumption current; and in a state where the backup power is supplied from the back-up power supply and also in a state where the electric power is supplied from the control power supply, the absolute encoder that can detect the occurrence of the abnormality associated with the increase in the consumption current.

First, in a state where the backup power is supplied from the back-up power supply, the absolute encoder that can detect the occurrence of the abnormality associated with the increase in the consumption current is described. FIG. 1 is a drawing illustrating the absolute encoder according to the first embodiment.

In the first embodiment, a case where in an absolute encoder 1 that is driven with the electric power supplied from the control power supply 3 and the back-up power supply 2, especially in a state where the backup power is supplied from the back-up power supply 2 and the abnormality detection circuit for detecting the abnormality is provided when the abnormality associated with the increase in the consumption current occurs in the absolute encoder 1 is described.

The absolute encoder 1 according to the first embodiment, as the abnormality detection circuit for detecting the abnormality of the absolute encoder 1 supplied with the electric power from the control power supply 3 and the back-up power supply 2, includes a plurality of regulators, a voltage detection unit 12, an abnormality detection unit 13, and an alarm output unit 14. In the present embodiment, in a state where the backup power is supplied from the back-up power supply 2, in order to detect the abnormality when the abnormality associated with the increase in the consumption current occurs in the absolute encoder 1, the abnormality detection circuit, consisting of a plurality of regulators, the voltage detection unit 12, the abnormality detection unit 13 and the alarm output unit 14, is connected with the back-up power supply 2.

The absolute encoder 1 is attached to, for example, the motor provided to the machine tool, the robot, etc., and the rotation shaft, and detects the positions of the motor and the rotation shaft. The absolute encoder 1 includes a memory (not illustrated) for storing (holding) various pieces of information including the position information, the home position information, etc., on the detected motor, the detected rotation shaft, etc., and a power supply process unit 15 for converting the voltage output by the control power supply 3 and the back-up power supply 2 into the voltage used for various operations of the absolute encoder 1. The power supply process unit 15 converts, for example, the voltage of 5[V] output by the control power supply 3 into, for example, a voltage of 3.3[V]. Further, when the power supply from the control power supply 3 is interrupted such as when the machine tool, the robot, etc., to which the absolute encoder 1 is provided end operations and when the power failure occurs, the power supply process unit 15 converts, for example the voltage of 4[V] output by the back-up power supply 2 into, for example, the voltage of 3.3[V]. Output voltages of both the control power supply 3 and the back-up power supply 2 are applied to the power supply process unit 15, but the power supply process unit 15 has a function of preferentially converting, for example, a higher applied output voltage into the voltage used for various operations of the absolute encoder 1. For example, by setting the output voltage of the control power supply 3 to be higher than the output voltage of the back-up power supply 2, when the output voltage of the control power supply 3 is applied, the power supply process unit 15 converts the output voltage of the control power supply into the voltage used for various operations of the absolute encoder 1, and when the application of the output voltage of the control power supply 3 is interrupted (i.e., when the power supply from the control power supply 3 is interrupted), converts the voltage output by the back-up power supply 3 into the voltage used for various operations of the absolute encoder 1.

The regulator that is one component of the abnormality detection circuit is a voltage regulator that outputs the constant voltage, and is configured from, for example, the linear regulator or the switching regulator. In general, the regulator has features to output the constant voltage specific to the regulator when the regulator is supplied with the drive current that is equal to or less than the specified value specific to the regulator, and to reduce the output voltage rapidly and output the voltage smaller than the constant voltage when the regulator is supplied with the drive current exceeding the specified value. In other words, the "specified value" can be an upper limit value of the drive current in which the regulator can output the constant voltage. In the abnormality detection circuit, based on the voltage output by a plurality of regulators that include the drive currents having different magnitudes and the different constant voltage output, the abnormality of the absolute encoder 1 is detected. Details of the abnormality detection process are described later.

A plurality of regulators described above are connected in parallel with each other and are connected between the back-up power supply 2 and the power supply process unit 15 of the absolute encoder 1. In the illustrated example, as a plurality of regulators, two regulators, i.e., a first regulator 11-1 and a second regulator 11-2 are provided. Both of the first regulator 11-1 and the second regulator 11-2 are connected between the back-up power supply 2 and the power supply process unit 15 and are connected in parallel with each other. Accordingly, the drive current for operating the first regulator 11-1 and the second regulator 11-2 is supplied from the back-up power supply 2.

In the plurality of regulators, the magnitude of the constant voltage output to the power supply process unit 15 of the absolute encoder 1 is different and the magnitude of the drive current needed for outputting the constant voltage is different. In other words, depending on the first regulator 11-1 and the second regulator 11-2, the magnitude of the output constant voltage is different, and the magnitude of the drive current needed for outputting the constant voltage is also different. More details are as follows.

The first regulator 11-1 supplies the current output by the back-up power supply 2 as a backup current for driving the absolute encoder when the power supply from the control power supply 3 is interrupted. In other words, in the first regulator 11-1, the constant voltage and the drive current are selected such that the electric power output by the back-up power supply 2 functions as the backup power with respects to the absolute encoder 1. Thus, it is preferable that the constant voltage output by the first regulator 11-1 has the same order of magnitude as the voltage output by, for example, the back-up power supply 2 alone (i.e., main body of back-up power supply 2). Further, it is preferable that the drive current input to the first regulator 11-1 when the absolute encoder 1 is in the normal state has the same order of magnitude as the output current when the back-up power supply 2 is in the normal state that is assumed when, for example, to the absolute encoder not provided with the abnormality detection circuit according to the present embodiment, the back-up power supply 2 is directly connected (i.e., consumption current of when absolute encoder not provided with the abnormality detection circuit according to the present embodiment is in the normal state). However, the "specified value," i.e., the upper limit value of the drive current in which the first regulator 11-1 can output the constant voltage needs to be set to a larger value than the output current when the back-up power supply 2 is in the normal state that is assumed when, to the absolute encoder not provided with the abnormality detection circuit according to the present embodiment, the back-up power supply 2 is directly connected. Accordingly, in the present embodiment, the regulator having the constant voltage and the (specified value) of the drive current is selected as the first regulator 11-1. For example, the first regulator 11-1 selects the output constant voltage of about 4.0[V] and the specified value of the drive current that guarantees the output of the constant voltage being about several tens of microampere to several hundred of microampere[A].

The second regulator 11-2 is selected such that the output constant voltage is smaller than the constant voltage output by the first regulator 11-1 and as the magnitude of the drive current needed for outputting the constant voltage, the magnitude larger than the magnitude of the drive current needed for the first regulator 11-1 to output the constant voltage. However, the constant voltage output by the second regulator 11-2 needs to include at least magnitude needed for the alarm output unit 14 for outputting the alarm signal at the time of the occurrence of the abnormality. In general, the LSI provided in the absolute encoder 1 (hereinafter referred to as "encoder LSI") includes a lower limit value of the voltage at which various operations including outputting the alarm signal by the alarm output unit 14 are guaranteed. In the present embodiment, as the constant voltage output by the second regulator 11-2, a value larger than the operation voltage lower limit value of the encoder LSI is selected. In summary, as the constant voltage output by the second regulator 11-2, a voltage that is smaller than the constant voltage output by the first regulator 11-1 and is larger than the operation voltage lower limit value of the encoder LSI in the absolute encoder 1 is selected. Further, as the "specified value," i.e., the upper limit value of the drive current in which the second regulator 11-2 can output the constant voltage, a value larger than the "specified value," i.e., the upper limit value of the drive current in which the first regulator 11-1 can output the constant voltage is set. In the present embodiment, such regulator having the constant voltage and the (specified value) of the drive current is selected as the second regulator 11-2. For example, when the operation voltage lower limit value of the encoder LSI in the absolute encoder 1 is 3.3[V], the second regulator 11-2 is configured such that the output constant voltage is about 3.7[V] and the drive current is about several hundreds of milli-amperes[A].

In case that when the consumption current of the absolute encoder 1 does not exceed the specified value of the drive current in which the first regulator 11-1 can output the constant voltage, the consumption current of the absolute encoder 1 does not exceed the specified value of the drive current in which the second regulator 11-2 can output the constant voltage also, and thus, both the first regulator 11-1 and the second regulator 11-2 output the constant voltages. Since the constant voltage output by the second regulator 11-2 is smaller than the constant voltage output by the first regulator 11-1, due to the potential difference therebetween, a circulation current may be generated between the first regulator 11-1 and the second regulator 11-2. In order to prevent this, a resistor (not illustrated) may be provided between the first regulator 11-1 and the second regulator 11-2. Alternatively, as the first regulator 11-1 and the second regulator 11-2, a regulator having the backflow prevention function may be used.

The voltage detection unit 12 detects the output voltage of at least one regulator of a plurality of regulators (in FIG. 1, the first regulator 11-1 and the second regulator 11-2). The output side of the first regulator 11-1 is connected with the output side of the second regulator 11-2, and since the connecting line is connected with the power supply process unit 15 of the absolute encoder 1, the voltage detection unit 12 detects the voltage applied by the back-up power supply 2 to the power supply process unit 15.

The abnormality detection unit 13, based on the output voltage detected by the voltage detection unit 12, detects the occurrence of the abnormality of the current from the back-up power supply 2 that is consumed when the absolute encoder 1 is driven. More specifically, when the output voltage detected by the voltage detection unit 12 is equal to or less than a certain threshold value, the abnormality detection unit 13 detects that the abnormality occurs in which the current consumed by the absolute encoder 1 increases. The threshold value is set between the constant voltage output by the first regulator 11-1 and the constant voltage output by the second regulator 11-2. The abnormality detection unit 13 is configured from, for example, a comparator such as an operational amplifier, a logic IC for conducting a comparison process on an analog-to-digital converter and digital data, etc. When it is determined that the abnormality occurs in the absolute encoder 1, the abnormality detection unit 13 notifies the alarm output unit 14 of the occurrence of the abnormality.

When the alarm output unit 14 is notified from the abnormality detection unit 13 of the occurrence of the abnormality, the alarm output unit 14 outputs the alarm signal. In other words, in a state where the backup power is supplied from the back-up power supply 2 when the abnormality associated with the increase in the consumption current occurs in the absolute encoder 1, the alarm output unit 14 outputs the alarm signal.

Next, details of the abnormality detection process are described.

Figure 2:
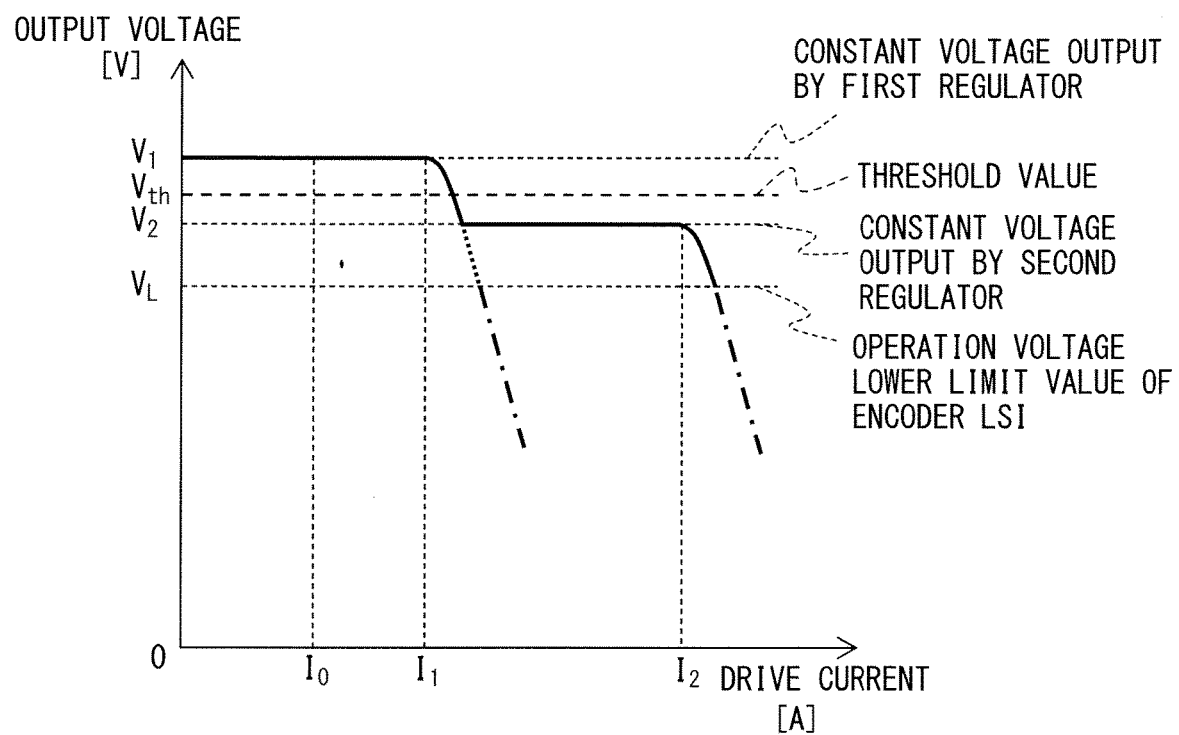
FIG. 2 is a graph exemplifying a relationship between a drive current and an output voltage of each regulator.

FIG. 2 is a graph exemplifying the relationship between the drive current and the output voltage of each regulator. In FIG. 2, it is assumed that the power supply from the control power supply 3 to the absolute encoder 1 is interrupted, and the absolute encoder 1 receives the backup power from the back-up power supply 2. The first regulator 11-1 has features to output the constant voltage $V_1$ when the drive current equal to or less than the specified value $I_1$ is supplied, and to reduce the output voltage rapidly and output a voltage that is smaller than the constant voltage $V_1$ when the drive current exceeding the specified value $I_1$ is supplied. Similarly, the second regulator 11-2 has features to output the constant voltage $V_2$ when the drive current equal to or less than the specified value $I_2$ is supplied, and to reduce the output voltage rapidly and output a voltage that is smaller than the constant voltage $V_2$ when the drive current exceeding the specified value $I_2$ is supplied.

As described with reference to FIG. 1, the constant voltage $V_1$ output by the first regulator 11-1 has the same order of magnitude as the voltage output by, for example, the back-up power supply 2 alone and is larger than the constant voltage $V_2$ output by the second regulator 11-2. Further, the constant voltage $V_2$ output by the second regulator 11-2 is larger than the operation voltage lower limit value $V_L$ of the encoder LSI in the absolute encoder 1. The specified value $I_1$, i.e., the upper limit value of the drive current in which the first regulator 11-1 can output the constant voltage $V_1$ is larger than the specified value $I_2$, i.e., the upper limit value of the drive current in which the second regulator 11-2 can output the constant voltage. The threshold value $V_{th}$ used for the abnormality detection process by the abnormality detection unit 13 is set to be a value between the constant voltage $V_1$ output by the first regulator 11-1 and the constant voltage $V_2$ output by the second regulator 11-2.

While the power supply from the control power supply 3 is interrupted, the absolute encoder 1 receives the backup power from the back-up power supply 2. During this time period, the voltage detection unit 12 detects the output voltage of at least one regulator of the first regulator 11-1 and the second regulator 11-2, and the abnormality detection unit 13 monitors the output voltage detected by the voltage detection unit 12 and determines whether the abnormality of the absolute encoder 1 occurs.

The consumption current when the absolute encoder 1 is in the normal state is assumed to be $I_0$. The consumption current $I_0$ of the absolute encoder 1 when the absolute encoder 1 is in the normal state does not exceed the specified value $I_1$, i.e., the upper limit value of the drive current in which the first regulator 11-1 can output the constant voltage $V_1$, and also does not exceed the specified value $I_2$, i.e., the upper limit value of the drive current in which the second regulator 11-2 can output the constant voltage $V_2$, and thus, the first regulator 11-1 outputs the constant voltage $V_1$ and the second regulator 11-2 outputs the constant voltage $V_2$. Since the constant voltage $V_1$ output by the first regulator 11-1 is larger than the constant voltage $V_2$ output by the second regulator 11-2, to the power supply process unit 15 of the absolute encoder 1, the constant voltage $V_1$ output by the first regulator 11-1 is applied. In other words, the absolute encoder 1 in the normal state, while the power supply from the control power supply 3 is interrupted, receives the backup power from the back-up power supply 2 via the first regulator 11-1. In other words, while the power supply from the control power supply 3 is interrupted, the current output by the back-up power supply 2 is supplied to the absolute encoder 1 in the normal state as the current for driving the absolute encoder 1, and the absolute encoder 1 consumes the current.

When the abnormality associated with the increase in the consumption current occurs in the absolute encoder 1, the drive current of the first regulator 11-1 gradually increases. When the drive current of the first regulator 11-1 exceeds the specified value $I_1$, i.e., the output voltage is rapidly reduced, and the first regulator 11-1 outputs a voltage smaller than the constant voltage $V_1$. When the output voltage of the first regulator 11-1 detected by the voltage detection unit 12 is equal to or less than the threshold value $V_{th}$, the abnormality detection unit 13 determines that the abnormality occurs in the absolute encoder 1 and notifies the alarm output unit 14 of the occurrence of the abnormality.

Even if the consumption current of the absolute encoder 1 further increases, as long as the consumption current does not exceed the specified value $I_2$, i.e., the upper limit value of the drive current in which the second regulator 11-2 can output the constant voltage $V_2$, the second regulator 11-2 continuously outputs the constant voltage $V_2$ and, the constant voltage $V_2$ output by the second regulator 11-2 is continuously applied to the power supply process unit 15 of the absolute encoder 1. As described above, as the constant voltage $V_2$ output by the second regulator 11-2, a value larger than the operation voltage lower limit value $V_L$ of the encoder LSI in the absolute encoder 1 is selected. In other words, as long as the consumption current of the absolute encoder 1 does not exceed the specified value $I_2$ of the drive current in which the second regulator 11-2 can output the constant voltage $V_2$, the absolute encoder 1 can continue operations at the constant voltage $V_2$ output by the second regulator 11-2. Accordingly, the alarm output unit 14 can be notified the occurrence of the abnormality from the abnormality detection unit 13, and can output the alarm signal.

Figure 3A:
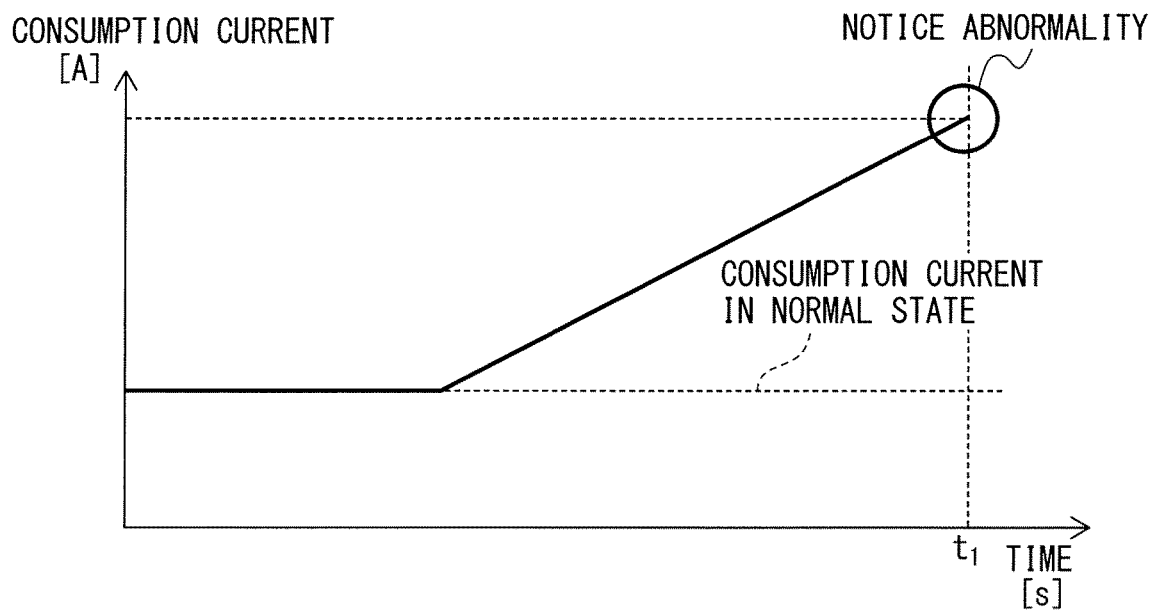
FIG. 3A is a graph for explaining a relationship between a time needed to detect the occurrence of the abnormality of the absolute encoder and the consumption current of the absolute encoder and illustrates a case where an abnormality detection circuit according to the first embodiment is not used.
Figure 3B:
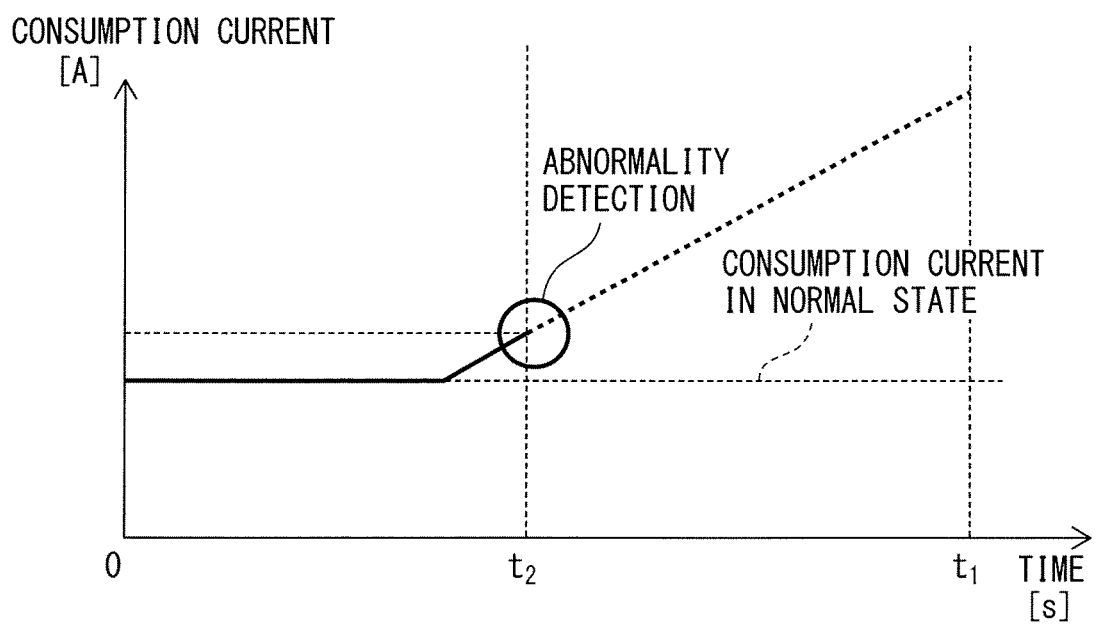
FIG. 3B is a graph for explaining a relationship between the time needed to detect the occurrence of the abnormality of the absolute encoder and the consumption current of the absolute encoder and illustrates a case where the abnormality detection circuit according to the first embodiment is used.

As described above, according to the absolute encoder 1 of the first embodiment, in a state where the backup power is supplied from the back-up power supply 2, based on a voltage output from a plurality of regulators that include the drive current having different magnitudes and the different constant voltage output, the abnormality associated with the increase in the consumption current of the absolute encoder 1 can be accurately detected. FIG. 3A is a drawing for explaining a relationship between the time needed to detect the occurrence of the abnormality of the absolute encoder and the consumption current of the absolute encoder and illustrates a case where the abnormality detection circuit according to the first embodiment is not used. FIG. 3B is a drawing for explaining a relationship between the time needed to detect the occurrence of the abnormality of the absolute encoder and the consumption current of the absolute encoder and illustrates a case where the abnormality detection circuit according to the first embodiment is used. When the abnormality detection circuit according to the first embodiment is not used as conventional, as illustrated in FIG. 3A, only after recognizing that the back-up power supply is consumed, a user can notice that, to the absolute encoder, the abnormality associated with the increase in the consumption current is caused (time $t_1$), and thus, a time has been needed for the detection of the occurrence of the abnormality. During this time period, since the electric power is not supplied from the back-up power supply, for example, the information stored in the memory in the absolute encoder is lost, there is a need to acquire again the home position information of the absolute encoder and store again various pieces of information on machines such as the machine tool, the robot, etc., to which the absolute encoder is attached, and accordingly the work efficiency is lowered. Further, if the absolute encoder is continuously used as it is without noticing the consumption of the back-up power supply, it may not be possible to acquire the accurate position information and in some cases, the serious accident may occur to the machine tool, the robot, etc., to which the absolute encoder is provided. On the other hand, according to the absolute encoder 1 of the first embodiment, even if the abnormality associated with the increase in the consumption current occurs in the absolute encoder 1 and the first regulator 11-1 may not be able to output the constant voltage $V_1$, as long as the consumption current of the absolute encoder 1 does not exceed the specified value $I_2$ of the drive current of the second regulator 11-2, since the second regulator 11-2 can continuously output the constant voltage $V_2$, the absolute encoder 1 can continue operations at the constant voltage $V_2$ output by the second regulator 11-2. Accordingly, since the alarm output unit 14 in the absolute encoder 1 can receive the notification of the occurrence of the abnormality from the abnormality detection unit 13 and output the alarm signal, as illustrated in FIG. 3B, before the back-up power supply 2 is consumed (time $t_2$), a user can grasp that the abnormality associated with the increase in the consumption current occurs in the absolute encoder 1. In this manner, if the absolute encoder 1 according to the first embodiment is used, a user can promptly recognize the occurrence of the abnormality of the absolute encoder 1 and thus, for example, it is possible to replace the absolute encoder 1 with the normal one and take measures of suppressing the abnormal consumption of the back-up power supply 2.

In this manner, according to the first embodiment, when the power supply from the control power supply 3 is interrupted and when the backup power is supplied from the back-up power supply 2, even if the abnormality associated with the increase in the consumption current of the absolute encoder 1 occurs, the absolute encoder 1 can receive the backup power from the back-up power supply 2 via a second regulator. Since as the constant voltage output by the second regulator 11-2 (i.e., voltage configuring backup power), a value larger than lower limit value of the voltage (the operation voltage lower limit value of the encoder LSI) in which various operations including the output operation of the alarm signal by the alarm output unit 14 are guaranteed is selected, the absolute encoder 1 (alarm output unit 14 in absolute encoder 1) can output the alarm signal. Accordingly, the machine tool and the robot to which the absolute encoder 1 is attached, based on the alarm signal output from the alarm output unit 14 of the absolute encoder 1, can conduct, for example, the protection operation. Further, for example, unit for informing a user of the occurrence of the abnormality on the basis of the alarm signal output from the alarm output unit 14 of the absolute encoder 1, may be constructed. Examples of unit for informing the user include a display such as a personal computer, a mobile terminal, and a touch panel and a display attached to the control device (not illustrated) of the robot and the machine tool. For example, on the display, following display may be shown: for example, "the abnormality occurs to the absolute encoder" "please replace the absolute encoder," or "please replace the back-up power supply." For example, unit for informing the user may be realized with the audio device that emits the sound such as sound, speaker, buzzer, and chime. Alternatively, the form of printing out the display on a page or the like using a printer and displaying the display may be taken. Alternatively, the display may be realized by appropriately combining the above.

Since the switching regulator is inexpensive compared with the shunt resistor, according to the present embodiment, the use of the switching regulator is low in the cost compared with a method of detecting the abnormality associated with the increase in the consumption current in the current detection circuit using the shunt resistor.

In the first embodiment above, an example in which as a plurality of regulators in the abnormality detection circuit, two regulators are provided has been described, but as described below, three or more regulators may be provided.

Figure 4:
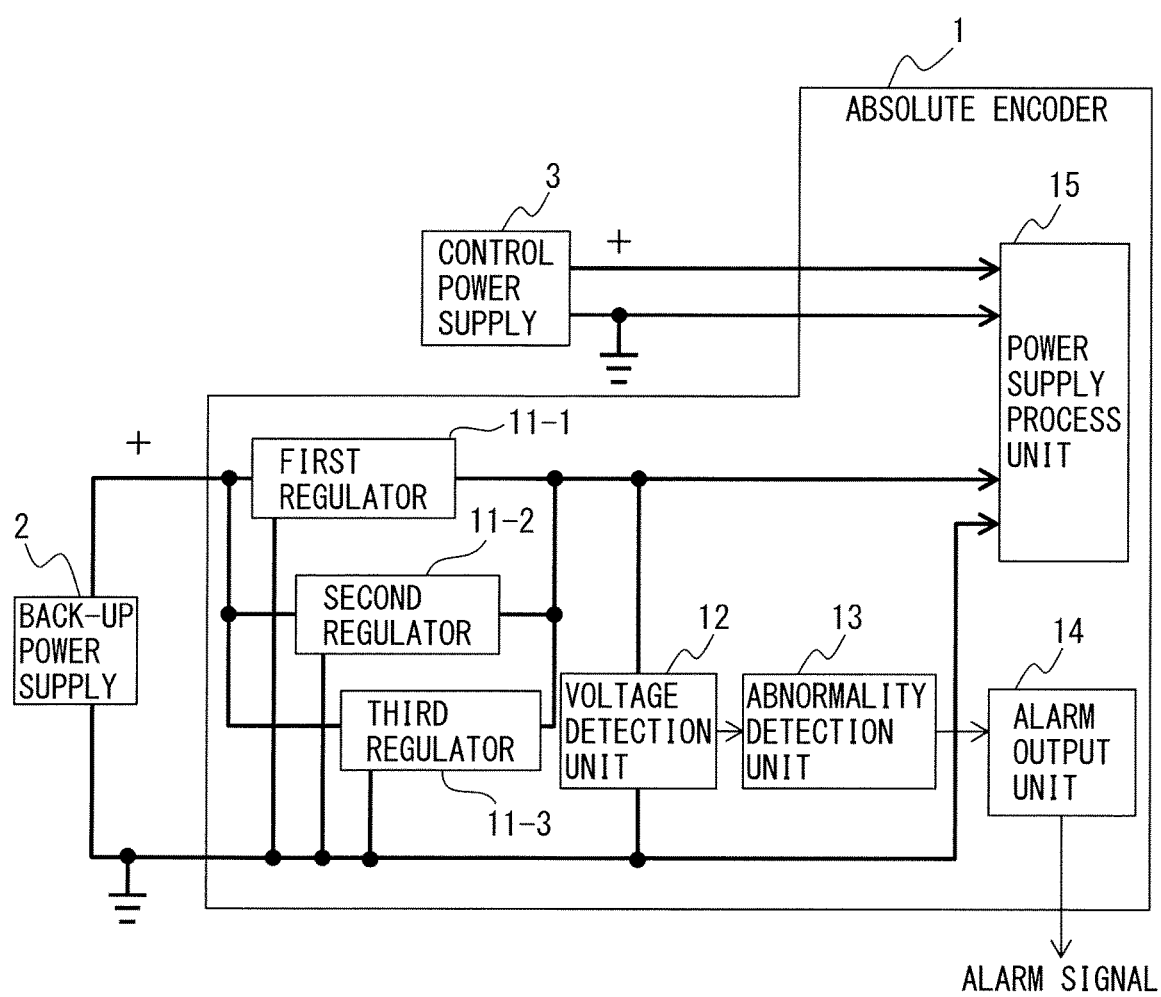
FIG. 4 is a drawing illustrating an absolute encoder according to an additional embodiment.
Figure 5:
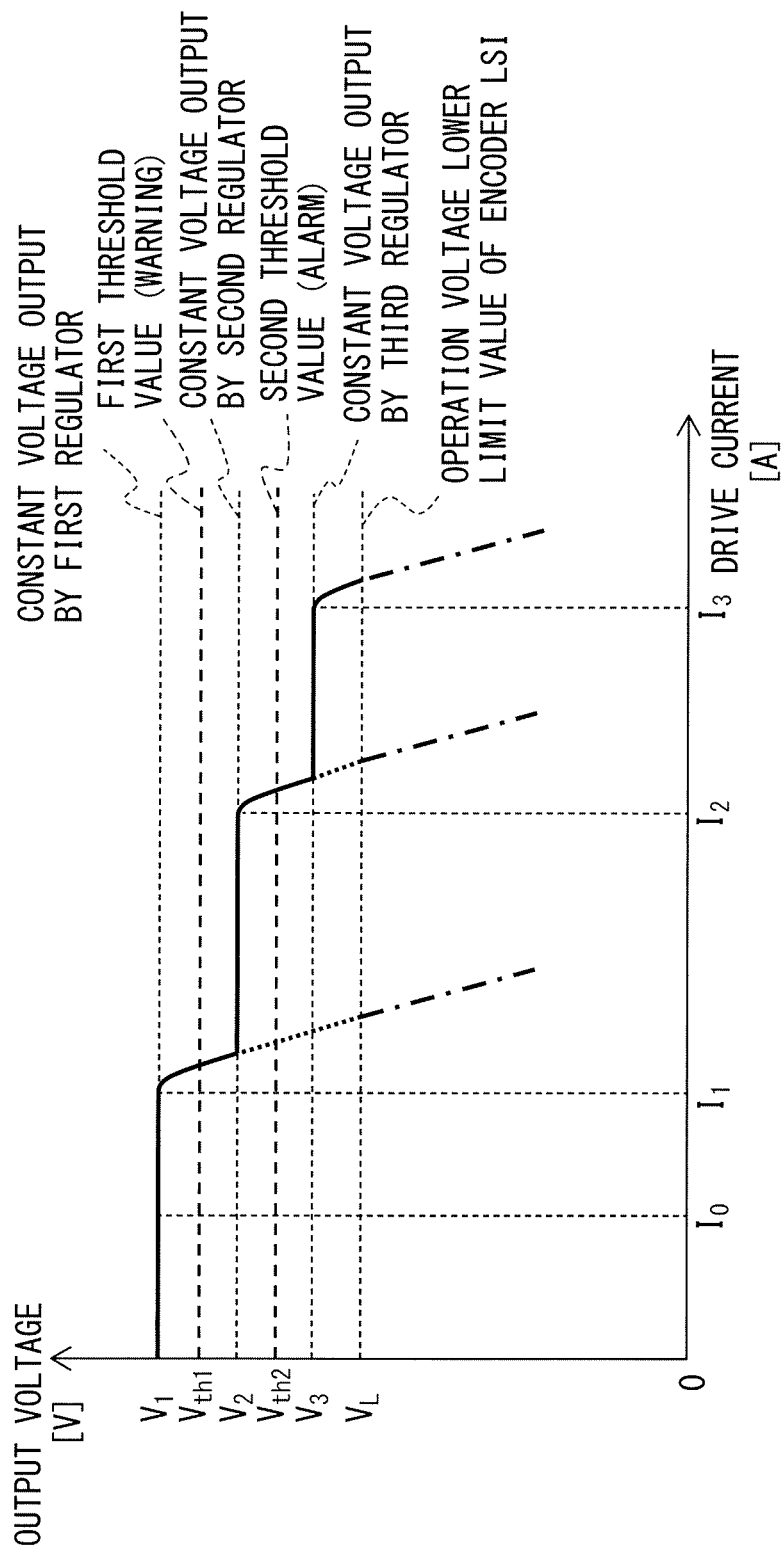
FIG. 5 is a graph for exemplifying a relationship between a drive current and an output voltage of each regulator according to the additional embodiment illustrated in FIG. 4.

FIG. 4 is a drawing illustrating the absolute encoder according to the additional embodiment. Further, FIG. 5 is a drawing exemplifying the relationship between the drive current and the output voltage of each regulator of the additional embodiment illustrated in FIG. 4. In FIG. 5, it is assumed that the power supply from the control power supply 3 to the absolute encoder 1 is interrupted and the absolute encoder 1 receives the backup power from the back-up power supply 2.

In the additional embodiment illustrated in FIG. 4 and FIG. 5, as a plurality of regulators in the abnormality detection circuit in the absolute encoder 1, three regulators, i.e., the first regulator 11-1, the second regulator 11-2 and a third regulator 11-3 are provided. All of the first regulator 11-1, the second regulator 11-2 and the third regulator 11-3 are connected between the back-up power supply 2 and the power supply process unit 15 and are connected in parallel with one another. Accordingly, the drive current for operating the first regulator 11-1, the second regulator 11-2 and the third regulator 11-3 is supplied from the back-up power supply 2.

In the additional embodiment illustrated in FIG. 4, the first regulator 11-1, the second regulator 11-2 and the third regulator 11-3 have different magnitudes of the output constant voltage and the different magnitudes of the drive current needed for outputting the constant voltage. In other words, the magnitude of the drive current and the magnitude of the constant voltage differ depending on the first regulator 11-1, the second regulator 11-2, and the third regulator 11-3.

Since the first regulator 11-1 is similar to the one described with reference to FIG. 1, detailed descriptions thereof are omitted, but a regulator in which the constant voltage $V_1$ and the drive current are selected such that the electric power output by the back-up power supply 2 functions as the backup power for the absolute encoder 1 is used. It is assumed that the specified value, i.e., the upper limit value of the drive current in which the first regulator 11-1 can output the constant voltage $V_1$ is $I_1$.

The constant voltage $V_2$ output by the second regulator 11-2 is selected to be smaller than the constant voltage $V_1$ output by the first regulator 11-1 and is larger than the drive current needed for the first regulator 11-1 to output the constant voltage $V_1$ as the drive current needed for outputting the constant voltage $V_2$. The specified value $I_2$, i.e., the upper limit value of the drive current in which the second regulator 11-2 can output the constant voltage $V_2$ is set to be a larger value than the specified value $I_1$, i.e., the upper limit value of the drive current in which the first regulator 11-1 can output the constant voltage $V_1$.

The third regulator 11-3 is configured such that the output constant voltage $V_3$ is smaller than the constant voltage $V_2$ output by the second regulator 11-2 and is larger than the drive current needed for the second regulator 11-2 to output the constant voltage $V_2$ as the drive current needed for outputting the constant voltage $V_3$. The constant voltage $V_3$ output by the third regulator 11-3 is selected to have at least the magnitude needed for the alarm output unit 14 to output the alarm signal at the time of the occurrence of the abnormality. In other words, the constant voltage $V_3$ output by the third regulator 11-3 is selected to be smaller than the constant voltage $V_2$ output by the second regulator 11-2 and is larger than the operation voltage lower limit value $V_L$ of the encoder LSI in the absolute encoder 1. Further, the specified value $I_3$, i.e., the upper limit value of the drive current in which the third regulator 11-3 can output the constant voltage $V_3$ is selected to be a larger value than specified value $I_2$, i.e., the upper limit value of the drive current in which the second regulator 11-2 can output the constant voltage $V_2$.

As described above, the three types of constant voltages, i.e., $V_1$, $V_2$ and $V_3$ are output from the three types of encoders, i.e., 11-1, 11-2 and 11-3. The first regulator 11-1 has features to output the constant voltage $V_1$ when the first regulator 11-1 receives the drive current equal to or less than the specified value and to reduce the output voltage rapidly and output the voltage smaller than the constant voltage $V_1$ when the first regulator 11-1 receives the drive current exceeding the specified value $I_1$. The second regulator 11-2 has features to output the constant voltage $V_2$ when the second regulator 11-2 receives the drive current equal to or less than the specified value $I_2$, and to reduce the output voltage rapidly and output a voltage smaller than the constant voltage $V_2$ when the second regulator 11-2 receives the drive current exceeding the specified value $I_2$. The third regulator 11-3 has features to output the constant voltage $V_3$ when the third regulator 11-3 receives the drive current equal to or less than the specified value $I_3$, and to reduce the output voltage rapidly and output the voltage smaller than the constant voltage $V_3$ when the third regulator 11-3 receives the drive current exceeding the specified value $I_3$.

In the present embodiment, the state (level) of the abnormality detection can be detected more finely by setting the threshold value used for the abnormality detection process of the abnormality detection unit 13 between the respective constant voltages. In other words, the first threshold value $V_{th1}$ is set between the constant voltage $V_1$ output by the first regulator 11-1 and the constant voltage $V_2$ output by the second regulator 11-2. The second threshold value $V_{th2}$ is set between the constant voltage $V_2$ output by the second regulator 11-2 and the constant voltage $V_3$ output by the third regulator 11-3. The first threshold value $V_{th1}$ is used for determining whether a state of the abnormality associated with the increase in the consumption current of the absolute encoder 1 is in the low level. For example, the first threshold value $V_{th1}$ is used in order to detect the so-called "low-level abnormality" in which although the abnormality associated with the increase in the consumption current occurs in the absolute encoder 1, the consumption current does not increase so much compared with the normal state, and the possibility of the rapid consumption of the back-up power supply 2 is low. The second threshold value $V_{th2}$ is used for determining whether the state of the abnormality associated with the increase in the consumption current of the absolute encoder 1 is in the high level. For example, the second threshold value $V_{th2}$ is used to detect the so-called "high-level abnormality" in which the abnormality associated with the large increase in the consumption current occurs in the absolute encoder 1 and the back-up power supply 2 is rapidly consumed.

While the power supply from the control power supply 3 to the absolute encoder 1 is interrupted, the absolute encoder 1 receives the backup power from the back-up power supply 2. During this time period, the voltage detection unit 12 detects the output voltage of at least one regulator of the first regulator 11-1 and the second regulator 11-2, and the abnormality detection unit 13 monitors the output voltage detected by the voltage detection unit 12 and using the first threshold value $V_{th1}$ and the first threshold value $V_{th2}$, determines whether the abnormality of the absolute encoder 1 occurs.

The consumption current $I_0$ of the absolute encoder 1 when the absolute encoder 1 is in the normal state does not exceed the specified value $I_1$ of the drive current in which the first regulator 11-1 can output the constant voltage $V_1$, the specified value $I_2$ of the drive current in which the second regulator 11-2 can output the constant voltage $V_2$, and the specified value $I_3$ of the drive current in which the third regulator 11-3 can output the constant voltage $V_3$, and thus, the first regulator 11-1 outputs the constant voltage $V_1$, the second regulator 11-2 outputs the constant voltage $V_2$, and the third regulator 11-3 outputs the constant voltage $V_3$. Since the constant voltage $V_1$ output by the first regulator 11-1 is larger than the constant voltage $V_2$ output by the second regulator 11-2 and the constant voltage $V_3$ output by the third regulator 11-3, the constant voltage $V_1$ output by the first regulator 11-1 is applied to the power supply process unit 15 of the absolute encoder 1. In other words, the absolute encoder 1 in the normal state, while the power supply from the control power supply 3 is interrupted, receives the backup power from the back-up power supply 2 via the first regulator 11-1. In other words, the absolute encoder 1 in the normal state, while the power supply from the control power supply 3 is interrupted, receives the current output by the back-up power supply 2 as the current for driving the absolute encoder 1, and the absolute encoder 1 consumes the current.

When the abnormality associated with the increase in the consumption current occurs in the absolute encoder 1, the drive current of the first regulator 11-1 gradually increases. When the drive current of the first regulator 11-1 exceeds the specified value $I_1$, the output voltage is rapidly reduced and the first regulator 11-1 outputs the voltage smaller than the constant voltage $V_1$. In the abnormality detection unit 13, when the output voltage of the first regulator 11-1 detected by the voltage detection unit 12 is equal to or less than the first threshold value $V_{th1}$, it is determined that, the low-level abnormality occurs, and the alarm output unit 14 is notified that the low-level abnormality occurs in the absolute encoder 1. In response to this, the alarm output unit 14 outputs to the absolute encoder 1 a warning signal indicating that the low-level abnormality occurs.

When due to the abnormality of the absolute encoder 1, the consumption current further increases and the drive current of the second regulator 11-2 exceeds the specified value $I_2$, the output voltage is rapidly reduced and the second regulator 11-2 outputs the voltage smaller than the constant voltage $V_2$. When the output voltage of the second regulator 11-2 detected by the voltage detection unit 12 is equal to or less than the second threshold value $V_{th2}$, the abnormality detection unit 13 determines that the high-level abnormality occurs in the absolute encoder 1, and notifies the alarm output unit 14 of the occurrence of the high-level abnormality. Even if the consumption current of the absolute encoder 1 largely increases, as long as the consumption current does not exceed the specified value $I_3$, i.e., the upper limit value of the drive current in which the third regulator 11-3 can output the constant voltage $V_3$, the third regulator 11-3 outputs the constant voltage $V_3$ and, the constant voltage $V_3$ output by the third regulator 11-3 is applied to the power supply process unit 15. As described above, the constant voltage $V_3$ output by the third regulator 11-3 is larger than the operation voltage lower limit value $V_L$ of the encoder LSI in the absolute encoder 1. In other words, as long as the consumption current of the absolute encoder 1 does not exceed the specified value $I_3$ of the drive current in which the third regulator 11-3 can output the constant voltage $V_3$, the absolute encoder 1 can operate at the constant voltage $V_3$ output by the third regulator 11-3. Accordingly, the alarm output unit 14 in the absolute encoder 1 receives the notification from the abnormality detection unit 13 that the high-level abnormality occurs and can output the alarm signal.

In the further embodiment described with reference to FIG. 4 and FIG. 5, an example in which, as a plurality of regulators, three regulators are provided has been described, but even if three or more regulators are provided, similarly, it is possible to detect the abnormality associated with the increase in the consumption current of the absolute encoder 1. As the number of the regulators is increased, the level of the abnormality associated with the increase in the consumption current of the absolute encoder 1 can be divided more finely. If it is possible to detect the level of the abnormality associated with the increase in the consumption current of the absolute encoder 1, it is easier to respond to the abnormal level. For example, when it is detected that the low-level abnormality occurs in the absolute encoder 1, it is possible to take measures to replace the absolute encoder 1 with the normal one and when it is detected that the high-level abnormality occurs in the absolute encoder 1, it is possible to take measures to replace both the absolute encoder 1 and the back-up power supply 2.

Figure 6:
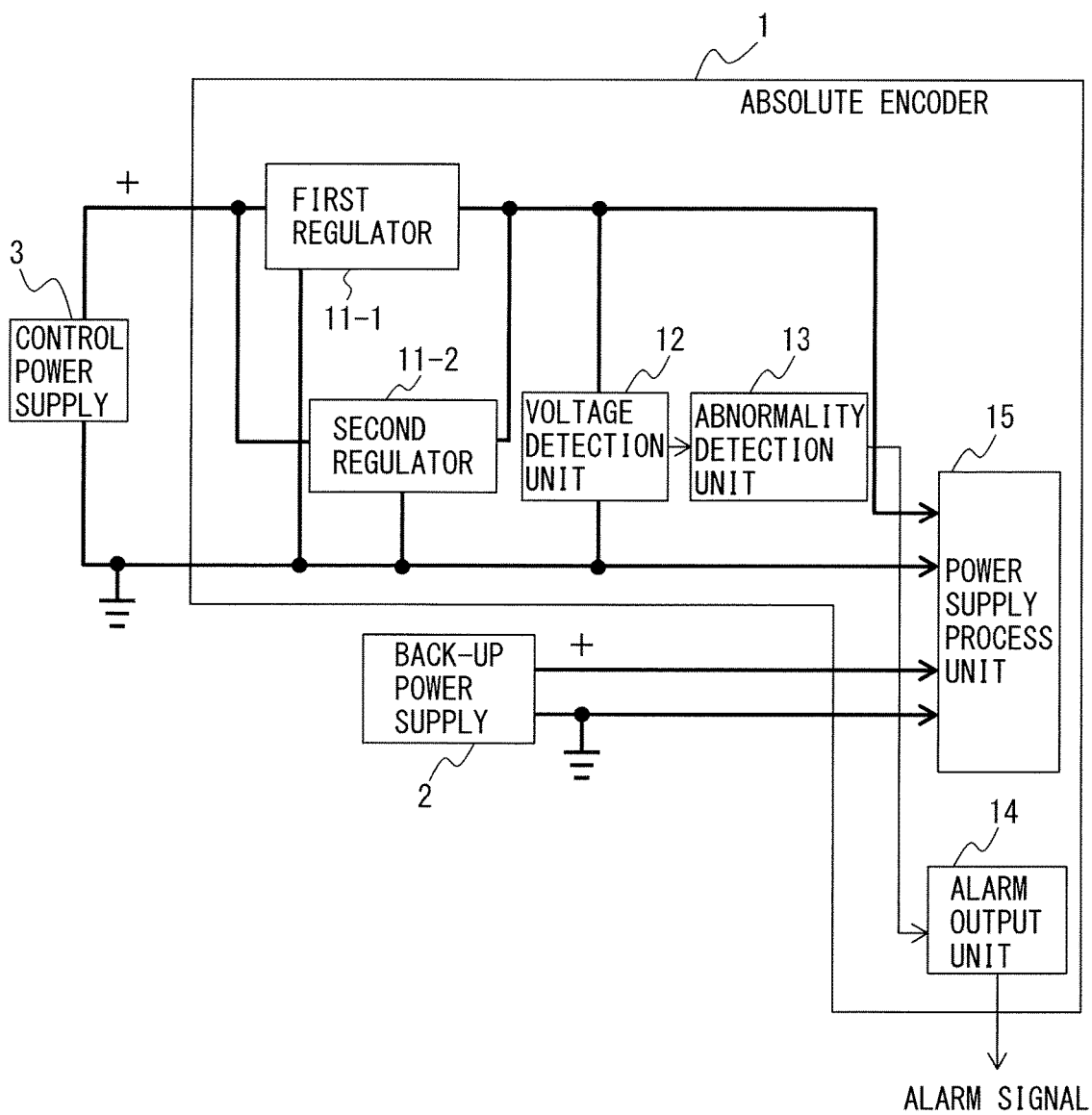
FIG. 6 is a drawing illustrating an absolute encoder according to a second embodiment.

Next, the absolute encoder that can detect the occurrence of the abnormality associated with the increase in the consumption current in a state where the electric power is supplied from the control power supply is described. FIG. 6 is a drawing illustrating the absolute encoder according to the second embodiment.

According to the second embodiment, in the absolute encoder 1 that is driven with the supply of the electric power from the control power supply 3 and the back-up power supply 2, especially in a state where the electric power is supplied from the control power supply 3 when the abnormality associated with the increase in the consumption current occurs in the absolute encoder 1, the abnormality detection circuit for detecting the abnormality is provided. In other words, in the second embodiment, the abnormality detection circuit according to the first embodiment is changed from the one corresponding to the back-up power supply 2 to the one corresponding to the control power supply 3.

The absolute encoder 1 according to the second embodiment, as the abnormality detection circuit for detecting the abnormality of the absolute encoder 1 supplied with the electric power from the control power supply 3 and the back-up power supply 2, includes a plurality of regulators, a voltage detection unit 12, an abnormality detection unit 13, and an alarm output unit 14. In the present embodiment, in a state where the backup power is supplied from the control power supply 3, when the abnormality associated with the increase in the consumption current occurs in the absolute encoder 1, in order to detect the abnormality, the abnormality detection circuit consisted of a plurality of regulators, the voltage detection unit 12, the abnormality detection unit 13 and the alarm output unit 14 is connected with the control power supply 3. Note that the power supply process unit 15 is as described with reference to FIG. 1 to FIG. 5.

In a state where the electric power is supplied from the control power supply 3 when the abnormality associated with the increase in the consumption current occurs in the absolute encoder 1, a plurality of regulators that are components of the abnormality detection circuit for detecting the abnormality are connected in parallel with one another and are connected between the control power supply 3 and the power supply process unit 15 of the absolute encoder 1. In the illustrated example, as a plurality of regulators, two regulators, i.e., the first regulator 11-1 and the second regulator 11-2 are provided. Both of the first regulator 11-1 and the second regulator 11-2 are connected between the control power supply 3 and the power supply process unit 15 and are connected in parallel with each other. Accordingly, the drive current for operating the first regulator 11-1 and the second regulator 11-2 is supplied from the control power supply 3.

Depending on the first regulator 11-1 and the second regulator 11-2, the magnitude of the output constant voltage differs and also the magnitude of the drive current needed for outputting the constant voltage differs.

The first regulator 11-1 supplies the current output by the control power supply 3 as the current for driving the absolute encoder. In other words, in the first regulator 11-1, the constant voltage and the drive current are selected such that the electric power output by the control power supply 3 functions as the driving electric power for the absolute encoder 1. Thus, it is preferable that the constant voltage output by the first regulator 11-1 has the same order of magnitude as the voltage output by, for example, the control power supply 3 alone (i.e., main body of control power supply 3). Further, the drive current input to the first regulator 11-1 when the absolute encoder 1 is in the normal state preferably has the same order of magnitude as the output current when the control power supply 3 is in the normal state that is assumed when, for example, the control power supply 3 is directly Connected with the absolute encoder not provided with the abnormality detection circuit according to the second embodiment (i.e., consumption current when absolute encoder not provided with the abnormality detection circuit according to the second embodiment is in the normal state). However, the "specified value," i.e., the upper limit value of the drive current in which the first regulator 11-1 can output the constant voltage needs to be a value larger than the output current when the control power supply 3 is in the normal state that is assumed when the control power supply 3 is directly connected with the absolute encoder not provided with the abnormality detection circuit according to the second embodiment. Accordingly, in the second embodiment, the regulator having such constant voltage and the (specified value) of the drive current is selected as the first regulator 11-1. As one example, the first regulator 11-1 is configured such that the output constant voltage is about 5.0[V], and the specified value of the drive current that guarantees the output of the constant voltage is about several tens of milli-amperes to about several hundreds of milli-amperes[A].

The second regulator 11-2 is selected such that the output constant voltage is smaller than the constant voltage output by the first regulator 11-1 and as the magnitude of the drive current needed for outputting the constant voltage, a magnitude large than the magnitude of the drive current needed for the first regulator 11-1 to output the constant voltage. However, the constant voltage output by the second regulator 11-2 needs to at least include the magnitude needed for the alarm output unit 14 for outputting the alarm signal at the time of the occurrence of the abnormality. In general, the encoder LSI provided in the absolute encoder 1 includes the lower limit value of the voltage in which the various operations including the output operation of the alarm signal by the alarm output unit 14 are guaranteed. In the present embodiment, as the constant voltage output by the second regulator 11-2, a value larger than the operation voltage lower limit value of the encoder LSI is selected. In summary, the constant voltage output by the second regulator 11-2 is selected to be smaller than the constant voltage output by the first regulator 11-1 and is larger than the operation voltage lower limit value of the encoder LSI in the absolute encoder 1. Further, as the "specified value," i.e., the upper limit value of the drive current in which the second regulator 11-2 can output the constant voltage, a value larger than the "specified value," i.e., the upper limit value of the drive current in which the first regulator 11-1 can output the constant voltage is set. In the present embodiment, the regulator having such constant voltage and the (specified value) of the drive current is selected as the second regulator 11-2. As one example, for example, when the operation voltage lower limit value of the encoder LSI in the absolute encoder 1 is 3.3[V], the second regulator 11-2 is configured such that the output constant voltage is about 4.7[V] and the drive current is about several[A].

Note that since the regulator according to the second embodiment is similar to the regulator according to the first embodiment except for the above described matters, descriptions thereof are omitted.

The voltage detection unit 12 detects the output voltage of at least one regulator of the first regulator 11-1 and the second regulator 11-2. Since the output side of the first regulator 11-1 is connected with the output side of the second regulator 11-2 and the connecting line is connected with the power supply process unit 15 of the absolute encoder 1, the voltage detection unit 12 detects the voltage applied by the control power supply 3 to the power supply process unit 15.

The abnormality detection unit 13, based on the output voltage detected by the voltage detection unit 12, detects the occurrence of the abnormality of the current from the control power supply 3 consumed when the absolute encoder 1 is driven. More specifically, when the output voltage detected by the voltage detection unit 12 is equal to or less than the certain threshold value, the abnormality detection unit 13 detects that the abnormality occurs in which the current consumed by the absolute encoder 1 increases. The threshold value is, as similar to the first embodiment, set between the constant voltage output by the first regulator 11-1 and the constant voltage output by the second regulator 11-2. When the abnormality detection unit 13 determines that the abnormality is caused to the absolute encoder 1, the abnormality detection unit 13 notifies the alarm output unit 14 of the occurrence of the abnormality.

When the alarm output unit 14 is notified from the abnormality detection unit 13 that the abnormality occurs, the alarm output unit 14 outputs the alarm signal. In other words, in a state where the electric power is supplied from the control power supply 3 when the abnormality associated with the increase in the consumption current occurs in the absolute encoder 1, the alarm output unit 14 outputs the alarm signal.

In the second embodiment also, the relationship between the drive current and the output voltage of each regulator described with reference to FIG. 2 is established. The operations of the absolute encoder 1 according to the second embodiment are described below with reference to FIG. 2.

The first regulator 11-1 has features output the constant voltage $V_1$ when the first regulator 11-1 receives the drive current equal to or less than the specified value $I_1$, and to reduce the output voltage rapidly and output the voltage smaller than the constant voltage $V_1$ when the first regulator 11-1 receives the drive current exceeding the specified value $I_1$. Further, the second regulator 11-2 has features output the constant voltage $V_2$ when the second regulator 11-2 receives the drive current equal to or less than the specified value $I_2$, and to reduce the output voltage rapidly and output the voltage smaller than the constant voltage $V_2$ when the second regulator 11-2 receives the drive current exceeding the specified value $I_2$.

The constant voltage $V_1$ output by the first regulator 11-1 has the same order of magnitude as, for example, the voltage output by the control power supply 3 alone and is larger than the constant voltage $V_2$ output by the second regulator 11-2. Further, the constant voltage $V_2$ output by the second regulator 11-2 is larger than the operation voltage lower limit value $V_L$ of the encoder LSI in the absolute encoder 1. The specified value $I_1$, i.e., the upper limit value of the drive current in which the first regulator 11-1 can output the constant voltage $V_1$ is larger than the specified value $I_2$, i.e., the upper limit value of the drive current in which the second regulator 11-2 can output the constant voltage. The threshold value $V_{th}$ used for the abnormality detection process by the abnormality detection unit 13 is set between the constant voltage $V_1$ output by the first regulator 11-1 and the constant voltage $V_2$ output by the second regulator 11-2.

The absolute encoder 1 receives the power supply from the control power supply 3, and during this time period, the voltage detection unit 12 detects the output voltage of at least one regulator of the first regulator 11-1 and the second regulator 11-2, and the abnormality detection unit 13 monitors the output voltage detected by the voltage detection unit 12 and determines whether the abnormality of the absolute encoder 1 occurs.

It is assumed that the consumption current when the absolute encoder 1 is in the normal state is $I_0$. Since the consumption current $I_0$ of the absolute encoder 1 when the absolute encoder 1 is in the normal state does not exceed the specified value $I_1$, i.e., the upper limit value of the drive current in which the first regulator 11-1 can output the constant voltage $V_1$ and the specified value $I_2$, i.e., the upper limit value of the drive current in which the second regulator 11-2 can output the constant voltage $V_2$, the first regulator 11-1 outputs the constant voltage $V_1$ and the second regulator 11-2 outputs the constant voltage $V_2$. Since the constant voltage $V_1$ output by the first regulator 11-1 is larger than the constant voltage $V_2$ output by the second regulator 11-2, the constant voltage $V_1$ output by the first regulator 11-1 is applied to the power supply process unit 15 of the absolute encoder 1. In other words, the absolute encoder 1 in the normal state receives the electric power from the control power supply 3 via the first regulator 11-1, and the absolute encoder 1 consumes the electric power.

When the abnormality associated with the increase in the consumption current occurs in the absolute encoder 1, the drive current of the first regulator 11-1 gradually increases. When the drive current of the first regulator 11-1 exceeds the specified value $I_1$, the output voltage is rapidly reduced and the first regulator 11-1 outputs the voltage smaller than the constant voltage $V_1$. When the output voltage of the first regulator 11-1 detected by the voltage detection unit 12 is equal to or less than the threshold value $V_{th}$, the abnormality detection unit 13 determines that the abnormality is caused to the absolute encoder 1 and notifies the alarm output unit 14 of the occurrence of the abnormality.

Even if the consumption current of the absolute encoder 1 further increases, as long as the consumption current does not exceed the specified value $I_2$, i.e., the upper limit value of the drive current in which the second regulator 11-2 can output the constant voltage $V_2$, the second regulator 11-2 continuously outputs the constant voltage $V_2$ and the constant voltage $V_2$ output by the second regulator 11-2 is continuously applied to the power supply process unit 15 of the absolute encoder 1. As described above, as the constant voltage $V_2$ output by the second regulator 11-2, a value larger than the operation voltage lower limit value $V_L$ of the encoder LSI in the absolute encoder 1 is selected. In other words, as long as the consumption current of the absolute encoder 1 does not exceed the specified value $I_2$ of the drive current in which the second regulator 11-2 can output the constant voltage $V_2$, the absolute encoder 1 can continue operations at the constant voltage $V_2$ output by the second regulator 11-2. Accordingly, the alarm output unit 14 receives the notification of the occurrence of the abnormality form the abnormality detection unit 13 and can output the alarm signal.

As described above, according to the absolute encoder 1 of the second embodiment, in a state where the electric power is supplied from the control power supply 3, it is possible to accurately detect the abnormality associated with the increase in the consumption current of the absolute encoder 1, based on a voltage output from a plurality of regulators that include the drive current having different magnitudes and the different constant voltage output.

According to the absolute encoder 1 of the second embodiment, even if the abnormality associated with the increase in the consumption current occurs in the absolute encoder 1 and the first regulator 11-1 may not be able to output the constant voltage $V_1$, since the second regulator 11-2 can continuously output the constant voltage $V_2$ as long as the consumption current of the absolute encoder 1 does not exceed the specified value $I_2$ of the drive current of the second regulator 11-2, the absolute encoder 1 can continue operations at the constant voltage $V_2$ output by the second regulator 11-2. Accordingly, the alarm output unit 14 in the absolute encoder 1 receives the notification of the occurrence of the abnormality from the abnormality detection unit 13, and can output the alarm signal. Accordingly, the machine tool and the robot provided with the absolute encoder 1 can perform, for example, the protection operation, based on the alarm signal output by the alarm output unit 14 of the absolute encoder 1. Further, for example, unit for notifying the user of the occurrence of the abnormality based on the alarm signal output by the alarm output unit 14 of the absolute encoder 1, may be constructed. By using the above unit for informing the user, a user can promptly recognize the occurrence of the abnormality of the absolute encoder 1, and thus, it is possible to take measures to replace, for example, the absolute encoder 1 with the normal one and prevent the failure of the control power supply 3. Further, since the switching regulator is inexpensive compared with the shunt resistor, according to the present embodiment, the use of the switching regulator is low in the cost compared with the method of detecting the abnormality associated with the increase in the consumption current in the current detection circuit using the shunt resistor.

In the above described second embodiment, an example in which as a plurality of regulators in the abnormality detection circuit, two regulators are provided has been described, but as described with reference to FIG. 4, three or more regulators may be provided.

Figure 7:
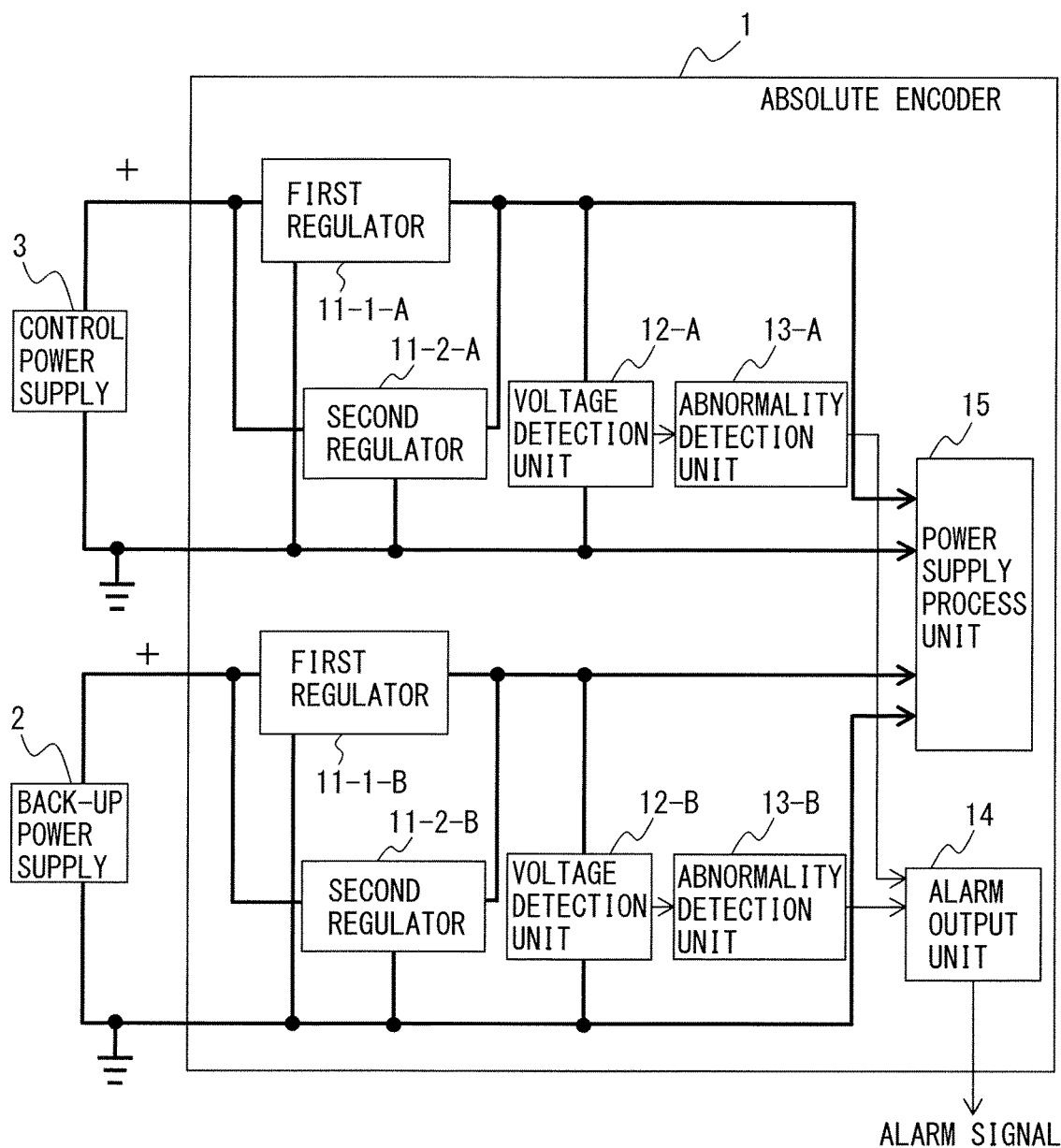
FIG. 7 is a drawing illustrating an absolute encoder according to a third embodiment.

Next, descriptions are given for the absolute encoder that can detect the occurrence of the abnormality associated with the increase in the consumption current both in a state where the backup power is supplied from the back-up power supply and in a state where the electric power is supplied from the control power supply. FIG. 7 is a drawing illustrating the absolute encoder according to the third embodiment.

The third embodiment is obtained by combining the first embodiment described with reference to FIG. 1 to FIG. 5 and the second embodiment with reference to FIG. 6, and in the absolute encoder 1 that is driven with the supply of the electric power from the control power supply 3 and the back-up power supply 2, both in a state where the electric power is supplied from the control power supply 3 and in a state where the backup power is supplied from the back-up power supply 2, the abnormality detection circuit for detecting the occurrence of the abnormality associated with the increase in the consumption current is provided.

The absolute encoder 1 according to the third embodiment supplied with the electric power from the control power supply 3 and the back-up power supply 2, in a state where the electric power is supplied from the control power supply 3, as the abnormality detection circuit for detecting the abnormality of the absolute encoder 1, includes a plurality of regulators (the first regulator 11-1-A and the first regulator 11-2-A), the voltage detection unit 12-A, and the abnormality detection unit 13-A. The abnormality detection circuit corresponding to the power supply by the control power supply 3 is as in the second embodiment described with reference to FIG. 6. Further, as the abnormality detection circuit for detecting the abnormality of the absolute encoder 1 in a state where the backup power is supplied from the back-up power supply 2, a plurality of regulators (the first regulator 11-1-B and the first regulator 11-2-B), the voltage detection unit 12-B and the abnormality detection unit 13-B are provided. The abnormality detection circuit corresponding to the backup power supply by the back-up power supply 2 is as in the first embodiment described with reference to FIG. 1 to FIG. 5. Note that the alarm output unit 14 is provided commonly to the abnormality detection circuit corresponding to the power supply by the control power supply 3 and the abnormality detection circuit corresponding to the backup power supply by the back-up power supply 2. In other words, the alarm output unit 14 is connected with both the abnormality detection unit 13-A and the abnormality detection unit 13-B, and outputs the alarm signal when the abnormality is detected in either a state where the electric power is supplied from the control power supply 3 or in a state where the backup power is supplied from the back-up power supply 2.

According to the absolute encoder 1 of the third embodiment, both in a state where the electric power is supplied from the control power supply 3 and in a state where the backup power is supplied from the back-up power supply 2, it is possible to accurately detect the abnormality associated with the increase in the consumption current of the absolute encoder 1, based on the voltage output from a plurality of regulators that include the drive current having the different magnitudes and the different constant voltage output. In other words, according to the third embodiment, the effects of both the first embodiment and the second embodiment can be achieved. Accordingly, the machine tool and the robot provided with the absolute encoder 1 can perform, for example, the protection operation, based on the alarm signal output by the alarm output unit 14 of the absolute encoder 1. For example, unit for informing the user of the occurrence of the abnormality based on the alarm signal output by the alarm output unit 14 of the absolute encoder 1, may be constructed. By using the above unit for informing the user, since a user can promptly recognize the occurrence of the abnormality of the absolute encoder 1, it is possible to for example, replace the absolute encoder 1 with the normal one to prevent the failure of the control power supply 3 and suppress the abnormal consumption of the back-up power supply 2. Further, since the switching regulator is inexpensive compared with the shunt resistor, according to the present embodiment, the use of the switching regulator is low in the cost compared with the method of detecting the abnormality associated with the increase in the consumption current in the current detection circuit using the shunt resistor.

Note that although in the above described third embodiment, an example in which as a plurality of regulators in the abnormality detection circuit, two regulators are provided has been described, three or more regulators may be provided as described with reference to FIG. 4.

According to one aspect of the present disclosure, it is possible to realize a low-cost absolute encoder that can accurately detect the abnormality associated with the increase in the consumption current of the absolute encoder.

The invention claimed is:

1. An absolute encoder that drives based on a current supplied from an electronic power supply, the absolute encoder comprising: a plurality of regulators connected in parallel with one another that receive, from an electronic power supply, a drive current in which a magnitude of a constant voltage output to the absolute encoder and a magnitude of a drive current needed for outputting the constant voltage are different; a voltage detection unit configured to detect an output voltage of at least one regulator of the plurality of regulators; and an abnormality detection unit configured to detect an abnormality of a current from an electronic power supply consumed when the absolute encoder is driven, based on an output voltage detected by the voltage detection unit.

2. The absolute encoder according to claim 1, wherein
the regulators output a constant voltage specific to the regulator when each of the regulators receives a drive current equal to or less than a specified value specific to the regulators, and the regulators output a voltage smaller than the constant voltage when the regulators receive a drive current exceeding the specified value.

3. The absolute encoder according to claim 1, wherein
when an output voltage detected by the voltage detection unit is equal to or less than a certain threshold value, the abnormality detection unit detects that an abnormality occurs to a current consumed by the absolute encoder.

4. The absolute encoder according to claim 1, further comprising:
an alarm output unit configured to output an alarm signal when the abnormality detection unit detects that an abnormality occurs in a current consumed by the absolute encoder.

5. The absolute encoder according to claim 3, wherein
the plurality of regulators include:
a first regulator configured to supply a current output by an electronic power supply as a current for driving the absolute encoder; and a second regulator that includes a smaller output constant voltage than a constant voltage output by the first regulator and a large drive current needed for outputting the constant voltage.

6. The absolute encoder according to claim 5, wherein the threshold value is set between a constant voltage output by the first regulator and a constant voltage output by the second regulator.

7. The absolute encoder according to claim 5, wherein a constant voltage output by the second regulator at least includes a magnitude needed for the alarm output unit to output an alarm signal when the abnormality detection unit detects that an abnormality occurs in a current consumed by the absolute encoder.

8. The absolute encoder according to claim 1, wherein an electronic power supply that outputs a current for driving the absolute encoder is a control power supply.

9. The absolute encoder according to claim 1, wherein an electronic power supply that outputs a current for driving the absolute encoder is a back-up power supply that is different from a control power supply.

\* \* \* \* \*